United States Patent
Wu

(10) Patent No.: US 6,259,617 B1
(45) Date of Patent: Jul. 10, 2001

(54) ELECTRIC BUS ARRANGEMENT AND METHOD FOR MINIMIZING THE INDUCTANCE IN AN ELECTRIC BUS ARRANGEMENT

(75) Inventor: Jian Mu Wu, Rockford, IL (US)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/446,829

(22) PCT Filed: Jul. 13, 1998

(86) PCT No.: PCT/DK98/00324

§ 371 Date: Mar. 21, 2000

§ 102(e) Date: Mar. 21, 2000

(87) PCT Pub. No.: WO99/07060

PCT Pub. Date: Feb. 11, 1999

(30) Foreign Application Priority Data

Jul. 28, 1997 (DE) ............................................. 197 32 402

(51) Int. Cl.[7] .................................................... H02M 1/00
(52) U.S. Cl. ............................ 363/144; 257/724; 363/141
(58) Field of Search ................................ 363/50, 55, 56, 363/132, 141, 144; 361/707; 257/687, 724

(56) References Cited

U.S. PATENT DOCUMENTS 4,907,068 * 3/1990 Amann et al. .......................... 357/74
5,132,896 * 7/1992 Nishizawa et al. ................... 363/144
6,028,779 * 2/2000 Sakamoto et al. ...................... 363/55

\* cited by examiner

Primary Examiner—Jessica Han
(74) Attorney, Agent, or Firm—Lee, Mann, Smith, McWilliams, Sweeney & Ohlson

(57) ABSTRACT

Electric bus arrangement (1) for DC-supply of power components, particularly for an inverter, having a first and a second plate (2, 3), arranged in parallel with each other, separated by an isolating layer (4), by which the first plate (2) connects first connections of power components (13) of a first group with first connections (23) of power components (14) of a second group, and the second plate (3) connects second connections of the power components (13) of the first group with second connections of the power components (14) of the second group. In such a bus arrangement an increase of the switching frequency is desired, however without the risk of damaging components due to overvoltage. For this purpose, the first and the second plates (2,3) are branching in the area of the circuit components (14) of the second group into connection extensions (15, 16), which are directed in different directions, and from the meeting point (17) of the connection extensions (15, 16) the first and the second plates are arranged in parallel.

12 Claims, 3 Drawing Sheets

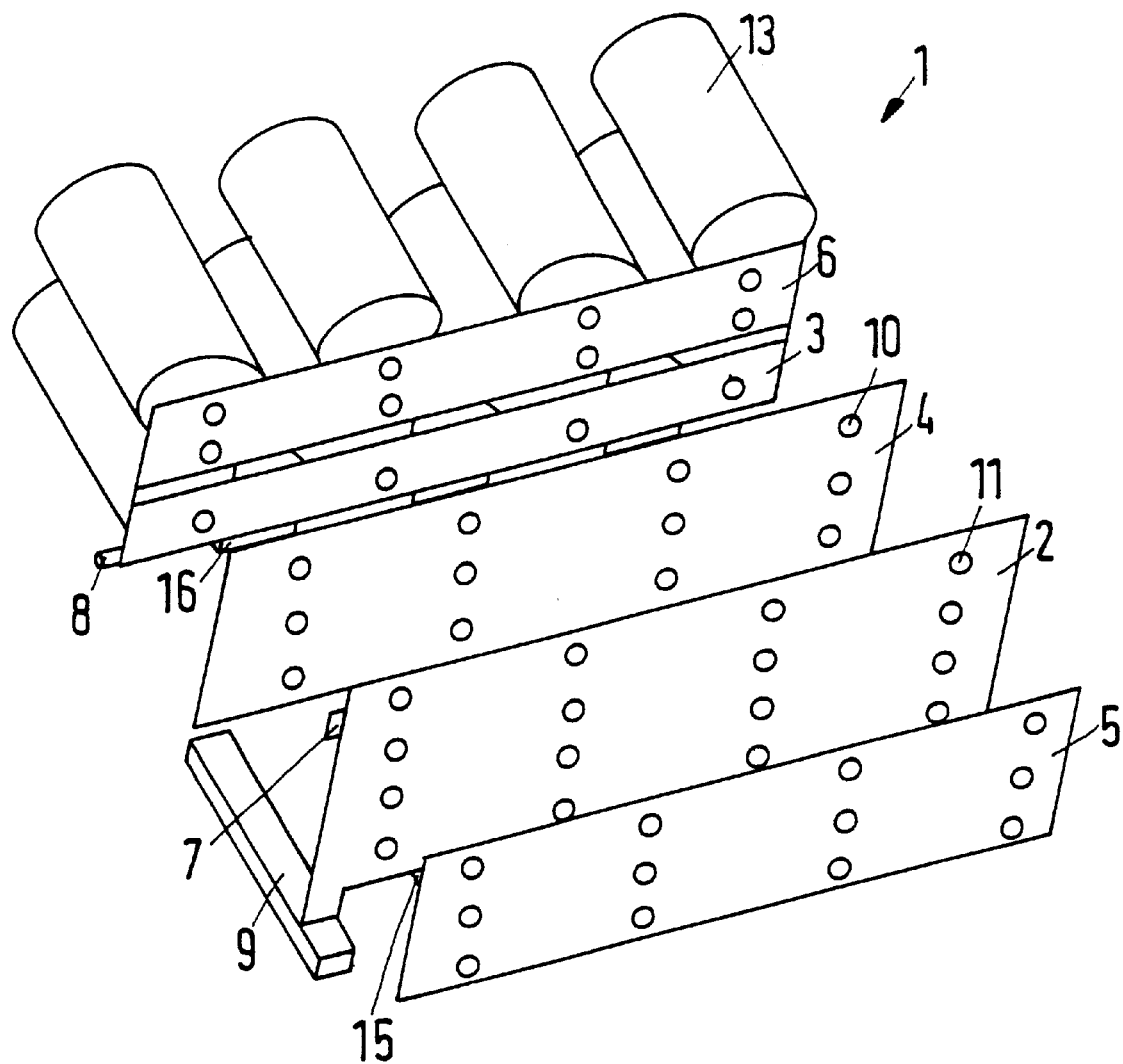

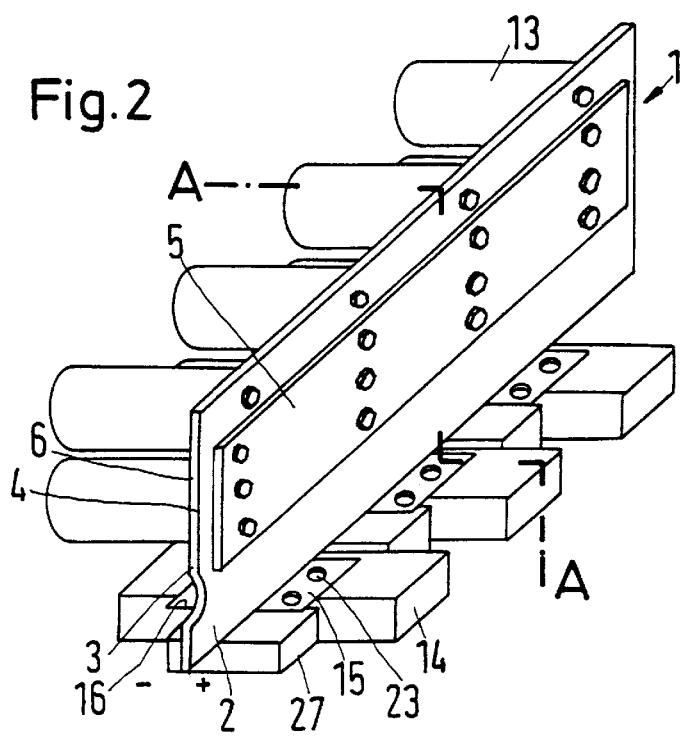
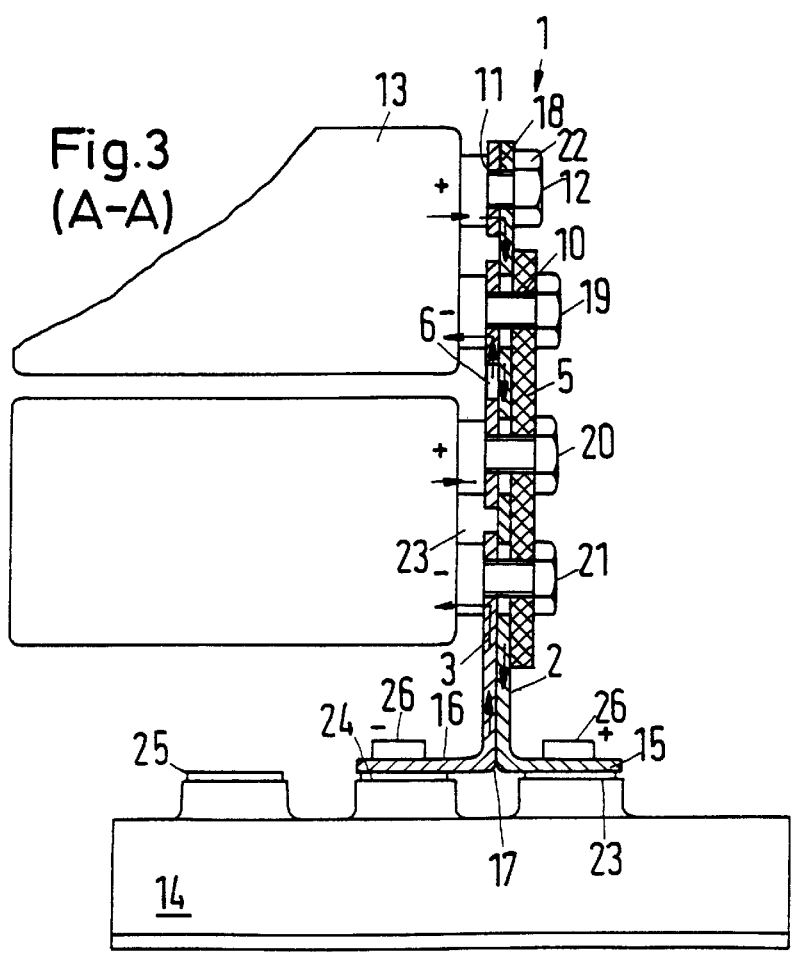

ELECTRIC BUS ARRANGEMENT AND METHOD FOR MINIMIZING THE INDUCTANCE IN AN ELECTRIC BUS ARRANGEMENT

BACKGROUND OF THE INVENTION

The invention concerns an electric bus arrangement for DC-supply of power components, particularly for an inverter, having a first and a second plate, arranged in parallel with each other separated by an isolating layer, by which the first plate connects first connections of power components of a first group with first connections of power components of a second group, and the second plate connects second connections of the power components of the first group with second connections of the power components of the second group. Further, the invention concerns a method for minimising the inductance in an electric bus arrangement for DC-supply of switching power components, by which the current in a first plate of the bus arrangement flows in one direction and the current in a second plate of the bus arrangement, parallel to and arranged adjacent to the first plate, flows in the opposite direction.

In the following the invention is described on the basis of a frequency converter, in the following called inverter, even though it can also be used for other applications. Initially, such an inverter rectifies electrical voltage from the mains and provides it to an intermediary circuit as DC voltage. Normally, coil and capacitors are arranged in the intermediary circuit, which again is connected to a circuit arrangement, which produces a single- or polyphase AC-current through switching on and off switches. E.g. via the frequency the switching arrangement controls the speed of electric single- or polyphase motors. To limit the out-put losses of the inverter, a high switching frequency is required. A special case, concerns a simple inverter by which the DC-voltage comes from another source.

However, a high frequency switching means a heavy temporal current change, i.e. a high di/dt. Correspondingly, high voltage peaks are induced during the switching due to the inductivity of the bus arrangement. The induced voltage peaks result from the known relation v=L·di/dt. It is therefore very important to keep the inductivity L and thus the inductance of the bus arrangement as low as possible.

To keep the inductance low, the conductors of the bus arrangement should be as short, thin and wide as possible. When conductors with the same currents, however flowing in opposite directions, are arranged so that they lie very close to and overlap each other, the magnetic flux generated by the opposite currents can be almost eliminated. In total the magnetic flux around the conductors will be substantially zero. Thus current changes will only cause small flux changes, which drastically reduces the reactance or the inductance of the bus conductors.

It is therefore commonly known to laminate the bus arrangement, i.e. provide it with a positive conductor, an isolating layer and a negative conductor, which are arranged to overlap each other. These conductors or bus bars carry currents with the same amplitudes and opposite directions from and to the capacitor arrangement in order to eliminate the magnetic flux generated through the switching currents in the bus bars.

E.g. JP 62 040069 A describes a laminated bus bar arrangement with a fitted capacitor. The bus bar arrangement has legs or extensions connecting to the power components. However, these connection legs have different lengths, as the legs of the negative plate project by at least the thickness of the bus arrangement. Additionally, the capacitor is fitted on legs projecting from the bus arrangement, by which the capacitor is fitted on an edge of the bus arrangement, which requires more space.

A different bus arrangement is known from U.S. Pat. No. 5,132,896. Also here the bus bars are made as plates, i.e. a positive plate connecting power switch poles with capacitor poles, and a negative plate connecting the remaining power switch poles with the remaining capacitor poles. The negative and positive plates are separated by an isolating layer, and fitted on the power components by screws. A characteristic feature of this construction is that the bus bars are used for both current transfer and heat dissipation.

JP 04 133669 A shows a laminated bus bar arrangement with a positive and a negative plate, an isolating plate and an intermediary plate. This intermediary plate is used to connect two capacitors in series. For this purpose the intermediary plate is arranged in the same plane as the positive plate. The bus plates serve as connectors between the capacitor and a rectifier and as conductor between the capacitor and the switches, when the capacitors deliver their energy through the switches.

In prior art bus arrangements (in the following, "bus arrangement" must be understood as an arrangement of conductors), a high degree of flux minimising has already been obtained. However, large areas appear in the bus arrangements, in which the bus plates do not overlap each other and thus do not contribute to the flux reduction. These "blind" spots are found in the areas, in which the power components are connected with the bus plates. In the mentioned U.S. Pat. No. 5,132,896 the end of the negative plate is Z-shaped and is fitted on the first poles of the power components, while the end of the positive plate is also Z-shaped. The positive plate is fitted parallel and close to the negative plate. However, it projects over the negative plate to reach the second poles of the power components. As the positive plate is longer than the negative plate, an area appears, which can no longer be neglected, in which the compensation for the magnetic flux is missing, which occurs during the current transfer from the capacitor to the power components. Further, a magnetic flux is generated through an inductive current flowing transversely, viz. from one collector to another, which is not compensated. This missing compensation causes a limitation on the switching frequencies. As mentioned above, the parasitic reactances cause overvoltages exceeding the nominal data of the power components. This will lead to either a reduction of the life or even to a damaging of the power components.

SUMMARY OF THE INVENTION

It is the task of the invention to enable an increase of the switching frequency without endangering the power components.

In an electric bus arrangement as mentioned in the introduction, this is solved in that, in the area of the power components of the second group, the first and the second plates branch into connection extensions each directed in different directions, and that, from the meeting point of the connection extensions the first and the second plates are arranged in parallel.

This results in the mutual overlapping of the two plates in the current-carrying area extending until the branching. Only from the branching does the elimination of the magnetic flux through oppositely flowing currents no longer take place. However, as only connection extensions, and not whole plate areas, are concerned, these non-compensated conductor areas are relatively small.

Preferably, the connection extensions are placed in a plane, which is not parallel to the plane to which the plates are parallel. In other words, two requirements are combined here. Firstly, the connection extensions must be placed in a plane, which is common for the connection extensions of the first and the second plates. However, this plane is not equal to the plane, in which the two plates of the bus arrangement are placed. This gives a geometric decoupling. The connection extensions offer sufficient space for the fitting of the power components. For this purpose the plates are projecting in an angle.

Preferably, the connection extensions are arranged at an angle of 90° in relation to the plates. This enables placing the branching point of the two plates in the same geometrical plane as defined by the connections or the poles of the power components. Further, this embodiment enables arrangement of the two plates vertically to this plane, involving the advantage that all other components, e.g. the power components of the first group, fixed on the plates, can be more easily accessed and cooled, e.g. through convection.

Advantageously, the connection extensions have the same length. Thus the plates are placed in the middle between the two poles, which makes the embodiment symmetrical. The magnetic flux in the two connection extensions is not compensated, but due to the rather small surface areas, this can be accepted.

Preferably, both plates have the same distance from the first connections and the second connections of the power components of the second group. This gives a symmetrical arrangement, and a mutual compensation of the currents is thus achieved.

Advantageously, the power components of the first group are arranged perpendicular to the plates. This facilitates the assembly. As mentioned above, also the cooling is easier. A relatively large area is available, via which heat can be dissipated.

Preferably, the second plate is divided into two plate parts arranged in the same plane. One plate part can be used as connector for the connections of the power components of the second group, and the other plate part can be used to realise certain switching configurations with regard to the power components of the first group.

This particularly applies, when the plate part not carrying the connection extension has a voltage potential which is approximately the middle of the potentials between the first and the second connections. E.g. this plate part can be used to connect two capacitor groups in series. In this connection it makes no difference that the two plate parts have different potentials. However, it is crucial that the current flows through them in the same direction. As this is the case, the two plate parts functionally form the first plate.

Alternatively, or additionally, the solution of the task mentioned above also appears in that the first plate is provided with several first conductor areas and the second plate is provided with a corresponding number of second conductor areas, by which the first conductor areas connect the first connections of the power components of the second group with each other or with a first power supply connection, and the second conductor areas connect the second connections of the power components of the second group with each other or with a second power supply connection, and that first and second conductor areas corresponding to each other are arranged to cover each other, and by which the power components are operated so that the sum of currents in first and second conductor areas corresponding to each other is the same before and after a switching operation.

The measures mentioned above cause that the inductance of the whole bus arrangement remains small, as the flux is reduced considerably by the currents flowing in opposite directions through the two plates. With the additional measure described here, the flux is not compensated, i.e. reduced by oppositely flowing currents, but flux changes are kept small. This is most easily explained on the basis of the inverter section of a polyphase inverter. A three-phase inverter has e.g. six controlled switches, which are bridged by anti-parallel connected freewheeling diodes. The switches are e.g. field effect transistors (FET) or bipolar transistors with isolated control electrode. Each leg in the inverter, in which two switches are arranged serially, is connected with a load via the centre tap. The current flows through a switch in a branch or leg, then through at least two phases of the load and then back through a switch of another branch. Thus the current flows through conductor sections, connecting the supply conductor to the corresponding output of the switch. When the switch is opened, the current can no longer flow through it. It then searches a path via the freewheeling diode of the second switch in the same switch branch. Correspondingly, it flows through the second supply conductor. When the two supply conductors are arranged to overlap each other on the plates, the current will flow in one plate before the opening of the switch and in the other plate after the opening, however always in the same area and in the same direction. Correspondingly, the flux will hardly change. It is not even a requirement that the current flows in concrete conductors, even though this will facilitate the design. Given that the two plates have approximately the same physical properties, it will be sufficient to position the corresponding connection points in the same way. As mentioned, this embodiment prevents flux changes. However, voltages will only be induced on changes of the magnetic flux. As long as the flux does not change, voltages and voltage peaks will not be induced.

Advantageously, the connection extensions are arranged opposite each other. This gives the opportunity of designing the current flow paths on the positive plate and those on the negative plate in the same way, so that they overlap each other. Thus the sums of currents on the first and the second plate can be kept equal, even when the switching state of the inverter changes.

With a method as mentioned in the introduction, the task is also solved in that the sum of currents before the switching in areas of the two plates overlapping each other is kept equal to the sum of currents in these areas after the switching.

In this way the flux is not compensated, i.e. equalised or reduced to zero by oppositely directed currents, it is only kept constant. Also a small local displacement of the magnetic flux corresponding to the width of a plate plus the width of the isolating layer will occur. This local change of the magnetic flux, however, only induces a small voltage peak, which can be accepted. Otherwise, voltages are hardly induced.

Advantageously, an auxiliary current is used to keep the sums of the currents equal to each other, which auxiliary current flows through a freewheeling diode of the second switch in the same switch branch. This auxiliary current appears automatically when one switch in the same switch branch is opened. It has the same amplitude as the current previously flowing through the switch, so that it is available in the correct amplitude and the correct direction. In other words, it is just moved to a different plate of the bus or conductor arrangement, so that only a very small flux change results from a displacement of the current flow.

BRIEF DESCRIPTION OF THE DRAWINGS

In the following the invention is explained on the basis of a preferred embodiment in connection with the drawings, showing:

FIG. 1 an exploded view of an electric bus arrangement

FIG. 2 a perspective view of the bus arrangement

FIG. 3 a section A—A according to FIG. 2

DESCRIPTION OF THE PREFERRED EMBODIMENTS

Figure 4:
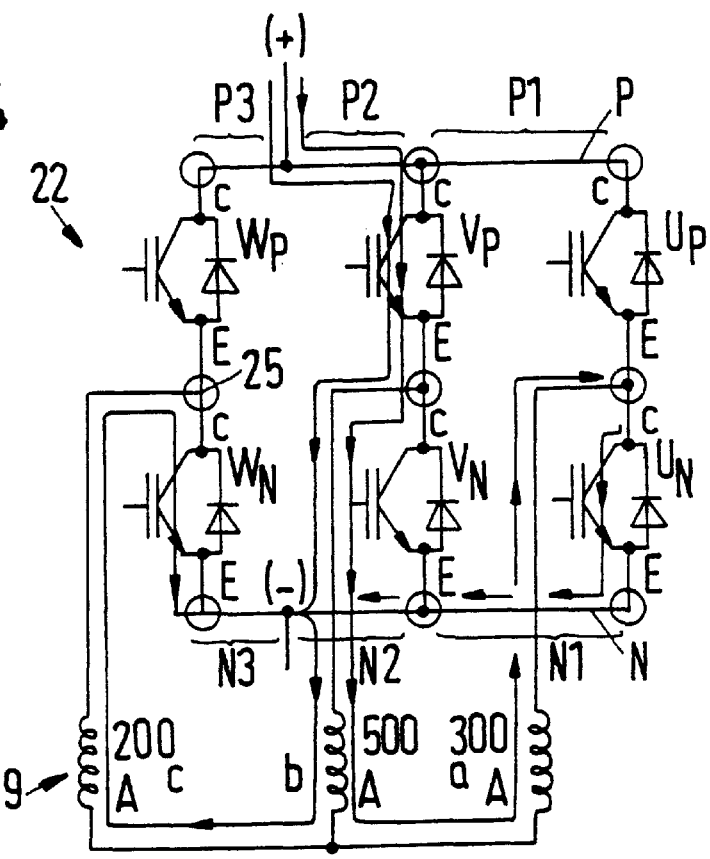
FIG. 4 a circuit arrangement with a first current course.

A bus arrangement 1, as shown in FIG. 1, serves as DC-supply in an inverter arrangement not shown in FIG. 1. The electric circuit diagram of such an inverter arrangement can be seen from FIGS. 4 and 5. The bus arrangement 1 can also be called a conductor arrangement. In a conductor arrangement for DC supply, two conductors are in principle sufficient, i.e. a positive conductor for the current flowing into the inverter and a negative conductor for the current flowing out of the inverter.

Correspondingly, the bus arrangement 1 is made of a first plate 2, in the following also called positive plate, and a second plate 3, in the following also called negative plate. The two plates 2, 3 are arranged with their surfaces in parallel against each other, and separated only by an isolating layer 4, which can be a plate or a foil (so thin that it cannot be seen in FIG. 2). The second plate 3 is covered completely by the plate 2. On the side of plate 2 opposite to the isolating layer 4, a retainer plate 5 is arranged. In the same plane as the second plate 3 an intermediary plate 6 is arranged, whose function is described later.

On the first plate 2 there is a positive connection 7, and on the second plate 3 there is a negative connection 8, which can be used for the current and voltage supply of the bus arrangement 1. The plates are joined together on sockets 9, which are electrically isolating. To keep the plates together and to create electrical connections, the plates 2 to 6 have bores 10, 11, through which connections or poles 12 of capacitors 13 can be led.

As can be seen from FIG. 2, the bus arrangement 1 with the capacitors 13 is mounted on modules 14 containing the switches of the inverter. These switches can e.g. be made as bipolar transistors with isolated control electrodes (IGBT= Insulated Gate Bipolar Transistor). The plates 2, 3 are arranged vertically to the modules 14.

The capacitors 13 form the circuit components of a first group, whereas the switching modules 14 form the circuit components of a second group. Thus the plates 2, 3 connect the capacitors 13 with the modules 14, via the plate 2, so that the current from the capacitors 13 can flow to the modules 14 and across the plates 3, 6, so that from the modules 14 the current can flow back to the capacitors 13. The capacitors are arranged in two rows over each other, and the capacitors of both the upper row and the lower row are connected in parallel, whereas the two rows are connected with each other in series. This is done by means of the intermediary plate 6. It connects the minus-poles of the capacitors of the upper row with the plus-poles of the capacitors of the lower row, as can be seen from FIG. 3. Thus, the intermediary plate 6 is placed on a voltage potential between the potentials of the plus-poles of the capacitors of the upper row and the minus-poles of the capacitors of the lower row. When the capacitors are the same, this means that the intermediary plate 6 is placed on the zero-potential, i.e. in the middle between the plus-and the minus-potential.

As can be seen from FIG. 3, the first, or plus, plate 2 has a connection extension 15, and the second, or minus, plate has a connection extension 16. Both connection extensions 15, 16 have the same length, and are bent at right angles with the plates 2, 3. Correspondingly, the plates 2, 3 are, as mentioned, arranged vertically to the modules 14. The two connection extensions 15, 16 meet at a point 17. From point 17 and upwards the plates 2, 3 or 2, 6, respectively, are parallel to and overlapping each other. The only exception is a small area 18 near the plus-pole 12 of the capacitor 13 in the upper row. However, this area is relatively far away from the modules 14, and the overlapping of plates 2, 3 and 2, 6 extends at least as far as the minus-pole 19 of the capacitor 13 in the upper row. The poles 12, 19 or the plus-pole 20 and the minus-pole 21, respectively, of the capacitors 13 in the lower row are connected with the bus arrangement 1 by means of screws or nuts. The retainer plate 5, which is made of a synthetic material, permits a certain pretension.

One of several advantages of this embodiment is the easy assembling and servicing. For replacement of a capacitor 13, it is sufficient to unscrew the screws 22, replace the capacitor and retighten the screws 22.

In a section view, the two plates 2, 3 are shaped as two "L", resting against each other back to back. The lower legs of the "L" do not cover the whole length of the plates 2, 3, but are limited to the area of the modules 14. Thus, relatively small surface areas are concerned. In the remaining areas, except for the area 18, two plates always lie opposite each other, in which the currents flow in opposite directions. This keeps the magnetic flux very small. Actually, it is reduced to the value zero.

Changes in the current, which are unavoidable, will thus in the worst case cause a change in the flux in the range zero. However, here they are relatively small, so that the small changes can also only induce small voltages. Thus, this arrangement keeps the total flux small. The connection extensions 15, 16 are connected with the connections or poles 23, 24 of the modules 14, where connection 23 is the plus-pole and connection 24 is the minus-pole. Further, the modules 14 have an additional connection 25 forming a centre tap, as explained in the FIGS. 4 and 5.

As on the one hand both connection extensions 15, 16 have the same length and on the other hand are bent at right angles to the plates 2, 3, the bus arrangement is not only arranged vertically to the modules 14. It is also placed in the middle between the connections 23, 24 and is placed in a geometrical plane defined by the connections 23, 24.

FIG. 2 shows that next to the modules 14 snubbers 27 can also be provided, which are also connected with the connection extensions 15, 16.

Figure 5:
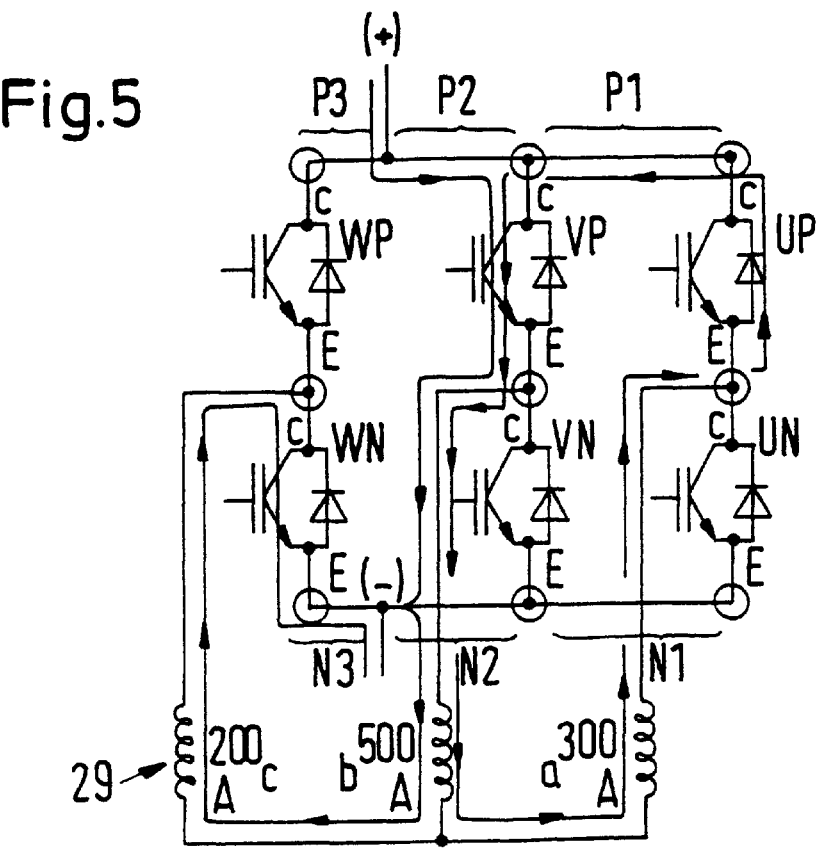
FIG. 5 a circuit arrangement with a second current course

FIGS. 4 and 5 show an additional measure for reduction of voltage peaks, which also permits an increase of the switching frequencies. This measure originates from the same basic idea, i.e. the utilisation of current paths overlapping or covering each other with the purpose of reducing flux changes.

FIG. 4 shows the switching state of an inverter 28 formed of three electrically parallel-connected modules 14, in a state shortly before the opening of a switch $U_N$. FIG. 5 shows the state shortly after the opening of this switch $U_N$.

The inverter 28 has three branches, by which each branch is arranged between a plus-rail P (corresponding to plate 2) and a minus-rail N (corresponding to plate 3). Each branch has two serially arranged switches $U_P$, $U_N$, or $V_P$, $V_N$, or $W_P$, $W_N$, respectively. These switches are made as IGBT (Insulated Gate Bipolar Transistors). The emitter of the transistors with index P are connected with the collector of the transistors with the index N. The centre tap leading to the connection 25 is arranged in this connection. The rails P and N, however, are connected with the connections 23, 24.

The rails P, N are divided into three subsections $P_1$, $P_2$, $P_3$, and $N_1$, $N_2$, $N_3$, respectively, by which these sections are arranged between the positive and negative poles, respectively, of the switch branches or between the positive or negative poles, respectively, of the switch branches and a plus-connection (+) or a minus connection, respectively. These sections $P_1$, $P_2$, $P_3$, and $N_1$, $N_2$, $N_3$, respectively, can be made explicitly on the plates 2, 3. However, they do not have to. They result from the spatial arrangement of the poles and the connections, respectively, of the capacitors 13 and the modules 14.

In the switching state shown in FIG. 4, the switch $U_N$ is still closed. Correspondingly, the current flows from the plus-connection through the section $P_2$, the switch $V_P$, one phase b of a load 29 and then divides into two unequal currents in phases a and c. With an assumed current amperage of 500 A, a current of 300 A flows through phase a and a current of 200 A flows through phase c back to the connection 25. The 300 A then flow through the switch $U_N$ and through the conductor sections $N_1$, $N_2$. The 200 A in phase c of the load 29 flows through the switch $W_N$ and the conductor section $N_3$. In the P-rail only the conductor section $P_2$ is loaded with 500 A.

When the switch $U_N$ opens, the relatively high inductivity of the load 29 causes that the current and the current distribution in the phases a, b, c, do not change. Correspondingly, the current flows back to the point between the switches $U_P$ and $U_N$. As both switches are open, the current flows through the freewheeling diode which parallels the switch $U_P$ (each switch is provided with such a freewheeling diode) and the section $P_1$ and then through the switch $V_P$ back into the phase b. Correspondingly, the conductor section $P_2$ must only carry a current of 200 A, whereas no current is flowing in section $N_2$ any more. The conditions in sections $P_3$ and $N_3$, however, have not changed. In section $P_3$ no current is flowing, whereas in section $N_3$ a current of 200 A is flowing.

When comparing the sums of the sections $P_1$, $N_1$, and $P_2$, $N_2$, and $P_3$, $N_3$, respectively, it appears that the sums of the currents before opening the switch $U_N$ and after opening the switch $U_N$ (FIG. 5) remain unchanged. This can also be shown by means of the following table:

Current in the conductor sections

| | $P_1 N_1$ | Sum $P_1, N_1$ | $P_2 N_2$ | Sum $P_2, N_2$ | $P_3 N_3$ | Sum $P_3, N_3$ |
|---|---|---|---|---|---|---|
| FIG. 4 | 0 −300 | −300 | +500 −360 | +200 | 0 +200 | +200 |
| FIG. 5 | −300 0 | −300 | +200 0 | +200 | 0 +200 | +200 |

The current is displaced from one plate to the other. This gives a very small spatial change of the flux and thus a small induced voltage. As, however, the current amperage is not changed, the flux density remains the same, so that a change in the flux density will cause no induction of voltages.

In an inverter the currents are frequently switched on and off. Therefore, the magnetic fields caused by the currents oscillate and produce a current with high frequency through the capacitors and the snubber 27. However, the use of a bus arrangement 1 according to the invention, in which the plates are arranged in relation to each other so that only very small non-compensated areas exist, will cause the inductance to reduce the amplitude of the oscillations. It can thus be achieved that such inverters meet the requirements on electromagnetic interference. Also designing the snubber 27 becomes easier.

Further to the advantage of easier mounting and service, the vertical structure of the bus arrangement, as shown in FIG. 3, also involves the advantage that several capacitors can be connected in series. In this case the current flows from the plus-poles of the lower row through the intermediary plate 6 to the minus-poles of the capacitors in the upper row. However, the current direction will be from the lower row to the upper row, exactly as in the second plate 3, so that the intermediary plate 6 can functionally be regarded as a second plate 3, in which currents flow in the opposite direction as the currents in the first plate 2.

What is claimed is:

1. Electric bus arrangement for DC-supply of power components, the bus arrangement having a first plate and a second plate arranged in parallel with each other and being separated by an isolating layer, the first plate connecting first connections of power components of a first group with first connections of power components of a second group, and the second plate connecting second connections of the power components of the first group with second connections of the power components of the second group, and in an area of the power components of the second group, the first and the second plates branching into connection extensions each directed in a different direction, and from a meeting point of the connection extensions, the first and the second plates being arranged in parallel, and in which the power components of the first group are arranged on the plates.

2. Bus arrangement according to claim 1, in which the connection extensions are located in a plane which is not parallel to the plane to which the plates are parallel.

3. Bus arrangement according to claim 2, in which the connection extensions are arranged at an angle of 90° in relation to the plates.

4. Bus arrangement according to claim 1, in which the connection extensions have the same length.

5. Bus arrangement according to claim 1, in which both plates are the same distance from the first connections and the second connections of the power components of the second group.

6. Bus arrangement according to claim 1, in which the power components of the first group are arranged perpendicular to the plates.

7. Bus arrangement according to claim 1, in which the second plate is divided into two plate parts arranged in the same plane.

8. Bus arrangement according to claim 7, in which the plate part not having the connection extension has a voltage potential which is approximately midway between the potentials of the first and the second connections.

9. Electric bus arrangement for DC-supply of power components, the bus arrangement having a first and a second plate arranged in parallel with each other separated by an isolating layer, the first plate connecting first connections of power components of a first group with first connections of power components of a second group, and the second plate connecting second connections of the power components of the first group with second connections of the power components of the second group, the first plate having several first conductor areas and the second plate having a corresponding number of second conductor areas, the first conductor areas connecting the first connections of the power components of the second group with each other or with a first power supply connection, and the second conductor areas connecting the second connections of the power components of the second group with each other or with a second power supply connection, and first and second corresponding conductor areas being arranged to cover each other, so that when the power components are operated, the sum of currents in the first and second corresponding conductor areas is the same before and after a switching operation.

10. Bus arrangement according to claim 9, in which the connection extensions are arranged opposite each other.

11. Method for minimizing the inductance in an electric bus arrangement for DC-supply of switching power components including two plates, comprising the current in a first plate of the bus arrangement flowing in one direction and the current in a second plate of the bus arrangement, parallel to and arranged very close to the first plate, flowing in the opposite direction, and the sum of currents in areas of the two plates overlapping each other before switching being kept equal to the sum of currents in the overlapping areas after switching.

12. Method according to claim 11, in which an auxiliary current is used to keep the sums of the currents equal to each other, which auxiliary current flows through a freewheeling diode of a second switch in a switch branch.

* * * * *